Feb. 16, 1932.    J. W. WATSON ET AL    1,845,858

FRICTION MEMBER

Filed July 14, 1930

Inventors:
John Warren Watson
Clifford S. Redfield
by their Attorneys
Howson & Howson Patented Feb. 16, 1932

1,845,858

UNITED STATES PATENT OFFICE

JOHN WARREN WATSON, OF WAYNE, AND CLIFFORD S. REDFIELD, OF CHESTNUT HILL, PENNSYLVANIA, ASSIGNORS TO JOHN WARREN WATSON COMPANY, OF PHILADELPHIA, PENNSYLVANIA, A CORPORATION OF PENNSYLVANIA

FRICTION MEMBER

Application filed July 14, 1930. Serial No. 467,880.

Our invention relates to resistance or friction materials for use in conjunction with shock absorbers, recoil checks, brakes and other energy dissipators, as well as with clutches and other energy transmittors and other resistance or friction mechanisms; and also to anti-vibration and anti-squeak materials. It further relates to methods of rendering mechanisms or relatively movable parts free from relative vibration and spasmodic action, and also to processes of manufacturing such materials.

One object of our invention is to provide novel and highly useful materials of the type set forth which may be used for resistance or friction purposes and which will satisfactorily equalize the static and running co-efficients of friction in order that spasmodic action, vibration, and noises may be satisfactorily reduced and the working resistance satisfactorily maintained throughout their normal usage.

A further object is to provide a resistance or friction member, the wearing surface of which throughout its normal usage is substantially impervious to moisture and has relatively high wear-resisting qualities and can be used under severe conditions.

Still another object is to provide a resistance or friction member characterized by a substantially non-moisture absorbent wearing body which stores a movement-resistant plastic substance or composition and delivers and maintains it in contact with the part or parts whose relative movement it is desired to resist or control. Other objects will be apparent from a consideration of the specification and claims, including the novel process of preparing a suitable resistance or friction material.

Spasmodic action, vibrations and noises set up between relatively movable parts are generally caused by the relative grabbing or locking of the parts due to a too high static coefficient of friction between said parts. Attempts to reduce high static co-efficients have generally resulted in a too serious reduction of the running co-efficients of friction between said parts. In the present invention, however, we have succeeded in maintaining adequate running co-efficients of friction and at the same time reducing the static co-efficients to the point where there is no apparent grabbing or locking, and hence spasmodic action, vibration and noises are eliminated or satisfactorily reduced.

We accomplish this in the present invention by providing a matrix or carrying body which stores, releases and maintains between said matrix and a relatively movable part a plastic substance or composition which inherently resists movement or flow but which, at the same time, cannot cause the parts to detrimentally grab or lock or otherwise come to rest. Thus, with no locking or grabbing between said matrix and another relatively movable part, there can be no spasmodic relative action between said parts and hence there can be set up no vibrations and noises.

The plastic carrying matrix above referred to may be used for the lining of brakes, for shock absorber shoes or discs, for facings of clutches, for shoes or discs in vibration dampeners, for facing pulleys or for application in any one of a great many other duties where resistance or friction members or parts are called for and where it is desirable to so reduce the static co-efficient of friction as to insure absence of vibrations and noises and to so maintain a sufficiently high running co-efficient of friction as to insure suitable work being done. Also the material is useful for placing between parts where relative movement is very slight and where squeaks are consequently developed due to high static co-efficient of friction, such for example in motor cars as between the chassis frame and body sill, frame and fenders, doors and door jams, cowl and hood, spring leaves, etc., etc.

Our invention contemplates a matrix or holding body having rubber as its base and having a plastic substance or composition such as a soap of a fatty acid, and more particularly an insoluble soap of a fatty acid, and/or a reaction product thereof incorporated therein in such manner that during use for resistance or friction purposes, the presence of the soap (and/or the reaction product) on and at the working surface of the body is at all times insured. The soap (and/or the reaction product), the rubber, and any rubber fillers that may be used coact to present a wear-resisting surface which will produce the necessary movement-resisting action without grab, spasmodic action, vibration or noise, at least to a depth sufficiently below the original wearing surface to provide a member capable of giving satisfactory length of life. The product is also sufficiently impervious to moisture or water throughout the above depth so as not to defeat the aforesaid non-spasmodic qualities.

In the accompanying drawings, the friction material or member is illustrated.

Figure 1:
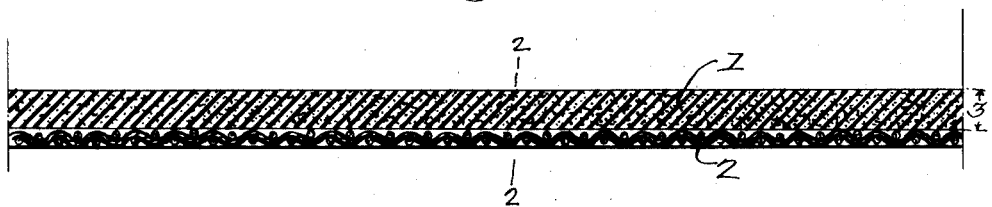
Figure 1 represents a strip of the material with the hard rubber matrix containing the soap shown at 1, and with a strengthening fabric which may be employed if desired shown at 2. The arrows at 3 illustrate the normal usage of the material and represent what may be termed the normal wearing surface, the original depth of which is dependent on the conditions under which the material is to be used.
Figure 2:
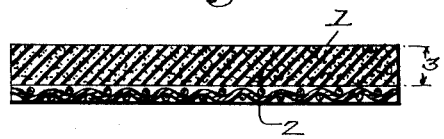
Figure 2 is a cross-sectional view of Figure 1 on lines 2—2.

As will appear hereinafter, the sulphur used in the compounding is greater in amount than that which would be normally employed in a similar rubber composition. Furthermore, the presence of magnesium compounds in the mix greatly improves the product. These factors, as well as an analysis of the final material leads to the belief that at least some of the soap has reacted with the sulphur and maybe also with the magnesium compounds to form a complex reaction product, although the magnesium compounds may only act as activators or catalysts for the reaction. The desirable and novel properties of the product of the invention may therefore be due in part at least to the presence of a reaction product of the soap. Hereinafter throughout the specification and claims where the term "soap of a fatty acid", "insoluble soap of a fatty acid", or "calcium stearate" or the like is used with reference to the final product, it is to be understood to include not only the soap itself but also any reaction product of the soap and sulphur or other materials in the compound formed during compounding or curing which co-operates in the product to give the properties outlined.

The term "soap of a fatty acid" includes, with varying results of course, as the cation the alkali, including ammonium, alkaline earth and heavy metals, and as the anion the various animal, fish, and vegetable soap radicals. For example, the following metallic soaps have been tested and found to be satisfactory: calcium, magnesium, strontium, barium, zinc, cadmium, aluminum, chromium, lead, tin, bismuth, iron, nickel, cobalt, copper, and manganese, although the last two named have a tendency to oxidize or deteriorate. The insoluble soaps of such fatty acids, as stearic, oleic, and palmitic, give excellent results. Of the soluble soaps of the fatty acids, ammonium soaps are particularly applicable. The alkaline earth soaps of the fatty acids, and more specifically calcium stearate, are especially adapted for use in accordance with the present invention. Calcium stearate is relatively cheap and can with the present invention be relatively easily supported in sufficient amount in a rubber-base matrix. When so supported, it results in a resistance or friction material having all the qualities hereinbefore set forth.

The term "hard rubber" includes rubber compounds in general which are relatively hard in contradistinction to the compounds which are soft and relatively resilient. Hard rubber compounds are generally, therefore, applicable for the present invention. The degree of hardness may be varied to suit the particular work for which the friction material is intended, but for most purposes the rubber is sufficiently hard so that, on shaving it with a knife it cuts fairly easily and the cuttings curl instead of chipping off.

The following example may be taken as typical of a hard rubber mix:

24% of smoked sheet
12% of zinc oxide
20% of lead oxide
2% of magnesium oxide
1% of calcium oxide The balance is filler, such as whiting, clay or barytes, and sulphur, the sulphur being about 30% by weight on the basis of the smoked sheet.

When the soap (calcium stearate) is incorporated in this mix, the sulphur is increased to about 43½% of the weight of the rubber. The percentage of calcium stearate may be varied and may be as low as 1½% but for general purposes an amount from 10% to 17% of the total weight of the composition gives excellent results. The calcium stearate is mixed with the other ingredients and the rubber on the ordinary rubber mill in the same manner as any other ingredient. The material is then vulcanized in molds or the like as in common practice, say at seventy pounds per square inch steam pressure (315° F.) for forty-five minutes. An improved product is obtained if the magnesium content of the mix is increased. In the above formula, an increase from 2% to 7% of magnesium compounds gives a somewhat more improved product; the magnesium content may be increased by adding magnesium oxide or magnesium carbonate or both. In the above formula, when the sulphur or magnesium content is increased, or when the soap is added, the amounts of smoked sheet, zinc, lead, and calcium oxide remains in the original percentage but the amount of filler is reduced accordingly.

In order to increase the resistance of the material to abrasion and wear, a smoked sheet with which glue has been mixed may be added to replace part of the smoked sheet. In doing this, sufficient glue-containing sheet is added so that the glue content on relation to the total weight of the mixture runs from 1.75% to 5%, averaging around 3½%.

To also increase the wearing qualities or to take the place of the glue, a mineral of the serpentine group called jefferisite, which has first been calcined and ground, may be added. This mineral is easily compounded with the rubber, and does not materially change the strength of the product. In fact, it increases the abrasive resistance of the friction material to a considerable extent, and its presence does not deleteriously affect the relation between the co-efficients of friction contemplated by the present invention. Jefferisite is found as a vein in clay formation and is also occasionally associated with feldspar and talc. As it comes from the quarries, it is compact and to some degree resembles dark mica. Upon being calcined or heated over an open flame, it expands to from sixteen to twenty times its original volume, at the same time crumbling and becoming very friable. In compounding with the rubber, the finely divided jefferisite is placed in the mill at a fairly early stage and before the rubber has become soft. The rubber takes the jefferisite up easily and further breaks down any sizable particles. The percentage used depends on the properties desired in the product, and in most cases 2% of the total composition serves the purpose. Smaller amounts are effective, but in a somewhat lesser degree. An amount above 6% will not normally be used since the running co-efficient of friction will thus be somewhat lowered, although the wear-resisting qualities are increased.

It has been found that very finely shredded fibrous material, such as cotton flocks, ramie, linen, jute, sisal, hemp, or cocoanut added to the mix improves certain of the desirable qualities of the product, such as increasing its length of life and also its tensile strength. The fibers are added on the mill with the other ingredients, and the mixing carried on as usual. The amount added may be varied, 1% being normally sufficient.

In a typical case and for manufacturing the friction material on a large scale, two mixes are milled separately and then combined. This procedure results in a more uniform mixing of the ingredients and a more definite control of the properties than might be possible if the ingredients were all mixed at one time. The mix (mix A), which may be termed the quality compound since in general it gives the qualities desired, is made up as follows:

| Material | Pounds | Ounces |
| --- | --- | --- |
| Crude rubber (prime-ribbed-smoked-sheet) | 26 | |
| Smoked sheet containing 50% bone glue | 17 | |
| Jefferisite (calcined and ground to pass 25 to 50 mesh screen) | 5 | |
| Calcium stearate | 11 | 14 |
| Cotton flocks | 2 | |
| Zinc oxide | 13 | 14 |
| Litharge (rubbermakers) | 13 | |
| Magnesium carbonate | 5 | 2 |
| Magnesium oxide | 2 | 6 |
| Lime | | 10 |
| Sulphur (rubbermakers) | 10 | |

The crude rubber is first put on the mill and as soon as it is caught on the roll, the smoked sheet containing the glue is added. These are worked together for about four or five minutes or until the rubber has become soft enough to allow the use of the mill knife. The addition of the cotton flocks is then made. The milling is continued until the rubber has become soft, hot and of a uniform color due to frequent cuttings. The calcium stearate is then added and is allowed to work into the rubber without the use of the knife. After the calcium stearate has been absorbed, the jefferisite is added a little at a time for otherwise there is a tendency for the rubber to be loosened from the roll. When the jefferisite has become well mixed, the zinc oxide, litharge, magnesium carbonate, magnesium oxide, and lime are all added together and worked in well. Care must be taken that the rolls are well cooled before the addition of the sulphur. After the sulphur is added, the batch is milled for a period of seven to ten minutes until the color is even and thorough mixing is brought about. During this milling, the knife is used frequently as in the usual milling procedure. The total milling time is about forty to forty-five minutes. Preferably, the finished mix is allowed to stand on the cooling racks for twenty-four hours before it is mixed with the second compound.

The mix (mix B), which may be termed the hardening compound, is made up as follows:

| Material | Pounds | Ounces |
| --- | --- | --- |
| Crude rubber (prime-ribbed-smoked-sheet) | 30 | |
| Calcium stearate | 22 | 8 |
| Zinc oxide | 15 | |
| Litharge (rubbermakers) | 30 | |
| Magnesium carbonate | 6 | |
| Magnesium oxide | 3 | |
| Lime | 1 | 8 |
| Sulphur (rubbermakers) | 18 | |

The rubber is put on the mill and worked until it is broken down to a very soft condition. The calcium stearate is then added and allowed to work itself into the rubber. The lime, zinc oxide, litharge, magnesium oxide, and magnesium carbonate are then added together and worked into the rubber by frequent cuttings. The sulphur is then added and the batch worked for seven to ten minutes to insure uniformity of the compound. This batch requires about forty-five to fifty minutes total milling time. It is, preferably, allowed to stand for twenty-four hours before use.

To obtain the final compound, fifty-three pounds of mix A and sixty-three pounds, ten ounces of mix B are placed on the mill and mixed together for about ten minutes. The batch is then cut off and cooled, after which the compound is preferably put again on the mill and softened and then sheeted directly from the mill or run through the calender to bring it to the desired thickness for subsequent treatment including vulcanization.

The vulcanization is carried out as usual, and a temperature of 315° F., corresponding to approximately seventy pounds of steam, may be used. If no organic accelerator has been incorporated, the time of curing will be approximately forty-five minutes; with an organic accelerator, the time may be cut to twenty to twenty-five minutes. The butyl aldehyde condensation product of dimethyl-paraphenylenediamine or other rubber accelerators are applicable and may be used if desired. If an organic accelerator is used, the amount of sulphur may be reduced corresponding to the reduction of sulphur made with the ordinary hard rubber mixes containing such accelerators. In this case, the sulphur content of the compound should be higher than that normally employed in like mixes using organic accelerators, since, as before pointed out, the use of an additional amount of sulphur is advisable due to the presence of the soap in the mix.

Referring to the soluble soaps, ammonium stearate, for example, may be substituted in the composition for the calcium stearate, and in the same proportions given for that compound.

While the ingredients in the mix and their proportions may be varied widely, more sulphur is generally employed than normally is used in the general run of hard rubber compounding, for apparently the sulphur, to some extent at least, combines with the calcium stearate or other soap of a fatty acid. Sufficient sulphur is, therefore, usually added to satisfy not only the other sulphur-reacting ingredients in the mix, but also at least a portion of the soap. In most cases, and particularly with calcium stearate, it is advisable to have a larger proportion of magnesium compounds present than used in the general run of hard rubber mixes. If desired, an anti-oxidant, mineral rubber and/or other compounds often used in rubber compounding, may be added.

Friction materials made as above possess high wear-resisting qualities and produce a sufficiently low static co-efficient of friction to render the relatively co-acting friction members sufficiently free from spasmodic action for the purpose intended throughout their normal usage, and at the same time possess a sufficiently high running co-efficient of friction to render said friction members useful for friction purposes. Furthermore, a friction member from the material compounded as above with its ability to withstand heat and wear without the addition of fabric or other moisture absorbent body in the normal wearing surface has little or no affinity for moisture and hence in the presence of moisture or water, the above desirable non-grabbing qualities are at no time altered as a result thereof. However, it may be found desirable to use fabric or other such material at a point removed from the normal wearing surface for strength or other purposes and this may be done without interfering with the non-grabbing action at the normal wearing surface.

Considerable modification is possible in the nature and proportion of the ingredients employed in the mix, the method of compounding the ingredients, the time and temperature of vulcanization, and the like, without departing from the essential features of the invention.

We claim:

1. A friction member rendered substantially free from causing spasmodic relative action with a relatively movable member, said friction member comprising a hard rubber matrix permeated by a soap of a fatty acid at least at a portion thereof intended for co-action with said other member, said matrix presenting a wearing surface substantially non-moisture absorbent throughout its normal use.

2. A friction member rendered substantially free from causing spasmodic relative action with a relatively movable member, said friction member comprising a hard rubber matrix permeated by an insoluble soap of a fatty acid at least at a portion thereof intended for co-action with said other member, said matrix presenting a wearing surface substantially non-moisture absorbent throughout its normal use.

3. A friction member rendered substantially free from causing spasmodic relative action with a relatively movable member, said friction member comprising a hard rubber matrix permeated by ammonium stearate at least at a portion thereof intended for co-action with said other member, said matrix presenting a wearing surface substantially non-moisture absorbent throughout its normal use.

4. A friction member rendered substantially free from causing spasmodic relative action with a relatively movable member, said friction member comprising a hard rubber matrix permeated by calcium stearate at least at a portion thereof intended for coaction with said other member, said matrix presenting a wearing surface substantially non-moisture absorbent throughout its normal use.

5. A friction member throughout its normal use rendered substantially free from causing spasmodic relative action with a relatively movable member comprising a hard rubber matrix permeated by a soap of a fatty acid at least at a portion thereof intended for co-action with said other member.

6. A friction member throughout its normal use rendered substantially free from causing spasmodic relative action with a relatively movable member comprising a hard rubber matrix permeated by an insoluble soap of a fatty acid at least at a portion thereof intended for co-action with said other member.

7. A friction member throughout its normal use rendered substantially free from causing spasmodic relative action with a relatively movable member comprising a hard rubber matrix permeated by ammonium stearate at least at a portion thereof intended for co-action with said other member.

8. A friction member throughout its normal use rendered substantially free from causing spasmodic relative action with a relatively movable member comprising a hard rubber matrix permeated by calcium stearate at least at a portion thereof intended for co-action with said other member.

9. A friction member throughout its normal use rendered substantially free from causing spasmodic relative action with a relatively movable member comprising the vulcanization products of a hard rubber compound and soap of a fatty acid, the soap of a fatty acid in the product permeating the hard rubber matrix at least at a portion thereof intended for co-action with said other member.

10. A friction member throughout its normal use rendered substantially free from causing spasmodic relative action with a relatively movable member comprising the vulcanization products of a hard rubber compound and an insoluble soap of a fatty acid, the insoluble soap of a fatty acid in the product permeating the hard rubber matrix at least at a portion thereof intended for co-action with said other member.

11. A friction member throughout its normal use rendered substantially free from causing spasmodic relative action with a relatively movable member comprising the vulcanization products of a hard rubber compound and ammonium stearate, the ammonium stearate in the product permeating the hard rubber matrix at least at a portion thereof intended for co-action with said other member.

12. A friction member throughout its normal use rendered substantially free from causing spasmodic relative action with a relatively movable member comprising the vulcanization products of a hard rubber compound and calcium stearate, the calcium stearate in the product permeating the hard rubber matrix at least at a portion thereof intended for co-action with said other member.

13. A friction member throughout its normal use rendered substantially free from causing spasmodic relative action with a relatively movable member comprising the vulcanization products of a hard rubber compound and soap of a fatty acid, the sulphur content of said hard rubber compound being greater than that normally required in said hard rubber mix and the soap of a fatty acid in the product permeating the hard rubber matrix at least at a portion thereof intended for co-action with said other member.

14. A friction member throughout its normal use rendered substantially free from causing spasmodic relative action with a relatively movable member comprising the vulcanization products of a hard rubber compound and an insoluble soap of a fatty acid, the sulphur content of said hard rubber compound being greater than that normally required in said hard rubber mix and the insoluble soap of a fatty acid in the product permeating the hard rubber matrix at least at a portion thereof intended for co-action with said other member.

15. A friction member throughout its normal use rendered substantially free from causing spasmodic relative action with a relatively movable member comprising the vulcanization products of a hard rubber compound and ammonium stearate, the sulphur content of said hard rubber compound being greater than that normally required in said hard rubber mix, and the ammonium stearate in the product permeating the hard rubber matrix at least at a portion thereof intended for co-action with said other member.

16. A friction member throughout its normal use rendered substantially free from causing spasmodic relative action with a relatively movable member comprising the vulcanization products of a hard rubber compound and calcium stearate, the sulphur content of said hard rubber compound being greater than that normally required in said hard rubber mix, and the calcium stearate in the product permeating the hard rubber matrix at least at a portion thereof intended for co-action with said other member.

17. A friction member rendered substantially free from causing spasmodic relative action with a relatively movable member, said friction member comprising the vulcanization products of a hard rubber compound and soap of a fatty acid, the sulphur content of said hard rubber compound being greater than that normally required in said hard rubber mix, and the soap of a fatty acid in the product permeating the hard rubber matrix at least at a portion thereof intended for co-action with said other member, said matrix presenting a wearing surface substantially non-moisture absorbent throughout its normal use.

18. A friction member rendered substantially free from causing spasmodic relative action with a relatively movable member, said friction member comprising the vulcanization products of a hard rubber compound and an insoluble soap of a fatty acid, the sulphur content of said hard rubber compound being greater than that normally required in said hard rubber mix, and the insoluble soap of a fatty acid in the product permeating the hard rubber matrix at least at a portion thereof intended for co-action with said other member, said matrix presenting a wearing surface substantially non-moisture absorbent throughout its normal use.

19. A friction member rendered substantially free from causing spasmodic relative action with a relatively movable member, said friction member comprising the vulcanization products of a hard rubber compound and ammonium stearate, the sulphur content of said hard rubber compound being greater than that normally required in said hard rubber mix, and the ammonium stearate in the product permeating the hard rubber matrix at least at a portion thereof intended for co-action with said other member, said matrix presenting a wearing surface substantially non-moisture absorbent throughout its normal use.

20. A friction member rendered substantially free from causing spasmodic relative action with a relatively movable member, said friction member comprising the vulcanization products of a hard rubber compound and calcium stearate, the sulphur content of said hard rubber compound being greater than that normally required in said hard rubber mix, and the calcium stearate in the product permeating the hard rubber matrix at least at a portion thereof intended for co-action with said other member, said matrix presenting a wearing surface substantially non-moisture absorbent throughout its normal use.

JOHN WARREN WATSON.
CLIFFORD S. REDFIELD.